(12) United States Patent
Altshuler et al.

(10) Patent No.: US 7,174,444 B2
(45) Date of Patent: Feb. 6, 2007

(54) PREVENTING A READ OF A NEXT SEQUENTIAL CHUNK IN BRANCH PREDICTION OF A SUBJECT CHUNK

(75) Inventors: Eran Altshuler, Haifa (IL); Oded Lempel, Givat Ada (IL); Robert Valentine, Kyriat Tivon (IL); Nicolas Kacevas, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 10/402,145

(22) Filed: Mar. 31, 2003

(65) Prior Publication Data
US 2004/0193843 A1    Sep. 30, 2004

(51) Int. Cl.
*G06F 9/30* (2006.01)

(52) U.S. Cl. ............... 712/239; 712/233; 712/240

(58) Field of Classification Search ........... 712/233, 712/239–240
See application file for complete search history.

(56) References Cited

U.S. PATENT DOCUMENTS 6,088,793 A * 7/2000 Liu et al. ............... 712/239
6,910,119 B1 * 6/2005 Douglas .................. 712/216

* cited by examiner

*Primary Examiner*—Fritz Fleming
*Assistant Examiner*—Vincent Lai
(74) *Attorney, Agent, or Firm*—Pearl, Cohen, Zedek, Latzer, LLP

(57) ABSTRACT

A system and method of early branch prediction in a processor to evaluate, typically before a full branch prediction is made, ways in a branch target buffer to determine if any of said ways corresponds to a valid unconditional branch, and upon such determination, to generate a signal to prevent a read of a next sequential chunk.

26 Claims, 6 Drawing Sheets

PREVENTING A READ OF A NEXT SEQUENTIAL CHUNK IN BRANCH PREDICTION OF A SUBJECT CHUNK

FIELD OF THE INVENTION

Embodiments of the invention relate to processors, and more specifically to a system and method for early branch prediction in a multi-cycle branch predictor.

BACKGROUND OF THE INVENTION

Modern microprocessors implement a variety of techniques to increase speed and save power in the performance of instruction execution. One of such techniques is branch prediction. A branch predictor may save power and increase processor speed by predicting the branch to be taken in response to an instruction. A typical branch predictor may take more than one clock cycle to generate a prediction for a subject chunk that includes an instruction. During the second and subsequent cycles of processing an instruction through the branch predictor, the first stage of the fetch machine pipeline may continue reading the next sequential chunk, on the assumption that no branch will be taken from the subject chunk being processed in the branch predictor. If a branch is predicted, the next sequential chunk that had been read into the branch predictor can be flushed, and the fetch can resume with the predicted target branch. In that case, the reading of the next sequential chunk into the first stage of the branch prediction unit that had been undertaken before a prediction was delivered will have been unnecessary, and hence, a waste of power.

BRIEF DESCRIPTION OF THE FIGURES

Embodiments of the invention will be understood and appreciated more fully from the following description taken in conjunction with the appended drawings in which.

DETAILED DESCRIPTION OF THE INVENTION

Figure 1:
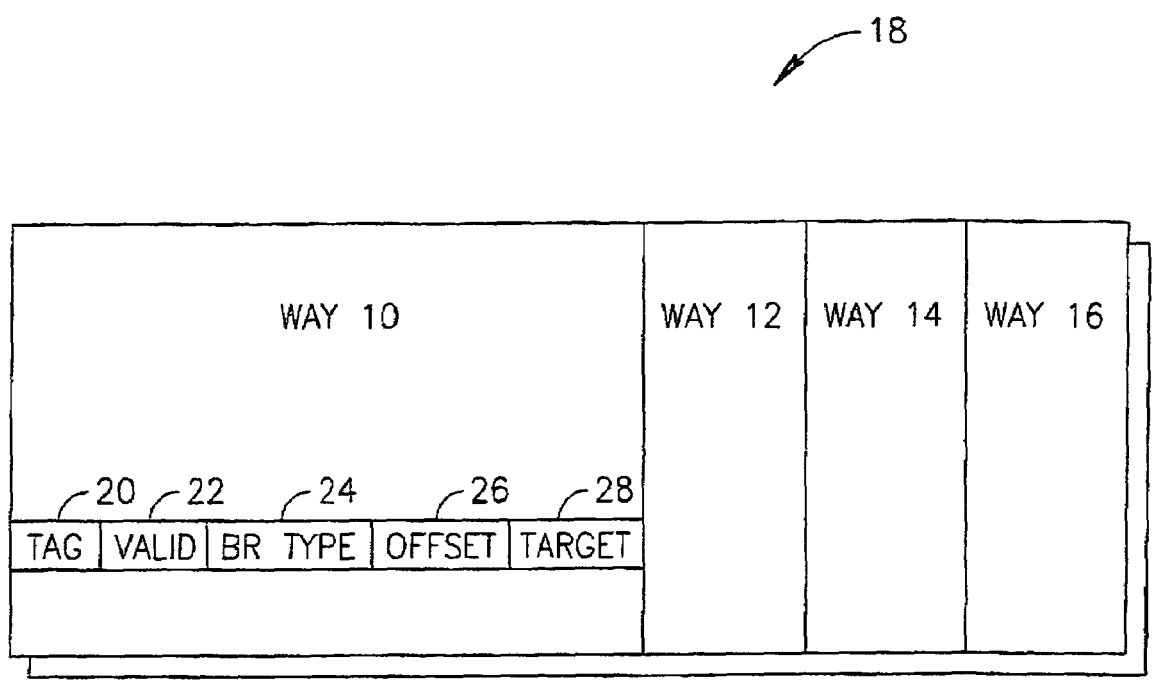
FIG. 1 is a schematic diagram of a four way set associative branch target buffer in accordance with an embodiment of the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "processing," "computing," "calculating," "determining," or the like, refer to the action and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer or other apparatus. Embodiments of the invention described herein are not described with reference to any particular programming language, machine code, etc. It will be appreciated that a variety of programming languages may be used to implement the teachings of the embodiments of the invention as described herein.

In the following description, a 'line' may mean a sequential series of bytes aligned around an address that may contain one or more instructions of fixed or varying lengths. Instructions in a line are typically positioned in an ascending sequence, and their positions on a line are typically reflected in the offset. A 'BTB line' or similar term may mean one of a plurality of lines in a Branch Target Buffer. A 'chunk' may mean one or more of the instructions on a line as well as one or more array entries relating to such instructions, such as for example, a Branch Target Buffer (BTB) array entry, Branch Prediction Unit (BPU) array entries, translation buffer table entries, etc. A 'subject chunk' may mean a chunk that has been read into a particular unit at a particular time, for example, a 'subject chunk' may mean a chunk that has been read into a branch prediction unit and about which the branch prediction unit may be generating a prediction. A 'cycle' may mean a clock cycle, read cycle or other cycle of a processor in processing instructions. An 'index' or 'current instruction pointer' may mean an address of the first instruction to be executed on a particular line, and may typically include a designation for the relevant line and an offset for the instruction. A 'set' means a group of entries in an array with a common set address, where a 'set address' means a part of an address used for an initial lookup in an array.

Reference is made to FIG. 1, a schematic diagram of a four way set associative BTB, in accordance with an embodiment of the invention. BTB 18 may include a plurality of BTB lines, and for each line, the plurality of ways 10–16 correspond to a branch instruction in a such line. Each line in a BTB may include a number of entries. Typically, BTB lines are divided according to a number of ways 10; typically one entry exists per way 10. Each way 10, 12, 14, 16 of BTB 18 may include, for example, a tag 20 field which may be used to match a read from the index in order to determine relevancy of the entry to the index, a valid 22 field which may be, for example, 0 or 1 and which may indicate whether way 10 is valid for the subject instruction, a branch type 24 which may, for example, indicate whether branch information in way 10 points to a conditional or unconditional branch, an offset 26 field which may provide information on the relative position of the branch instruction on a line, such that, for example, 0 indicates the corresponding branch instruction described by way 10 is in the first position on the line, 1 indicates that the corresponding branch instruction in way 12 is in the second position on the line, etc., and a target 28 field which may provide more specific information on the target of the branch instruction, if any, described by way 10. Other data items may be included in way 10, and other formats for ways 10–16 or BTB's may be used. For example, a greater or smaller numbers of ways 10–16 maybe included and other methods of organizing branch prediction data may be used.

In one embodiment of the invention, a circuit and/or set of logic may determine simultaneously, or in a single cycle if any of a set of branch instructions in a subject chunk corresponds to a valid unconditional branch. If so, a signal may be generated that inhibits or prevents a read of a next sequential chunk, possibly saving power or improving performance. In an embodiment of the invention, a "read prevent" signal is generated if branch instructions or instruction in a subject chunk call for an unconditional branch away from the next sequential chunk. Typically, a read prevent signal is generated before a full branch prediction can be formed, but may occur at other times in other embodiments. Furthermore, the read prevent signal may be generated within one cycle of the beginning of the branch prediction, but the read prevent signal may be generated at other times in other embodiments of the invention. Typically, a plurality of BTB entries (across one BTB line, for example) are examined and evaluated in one cycle to determine if an unconditional branch exists.

Figure 2:
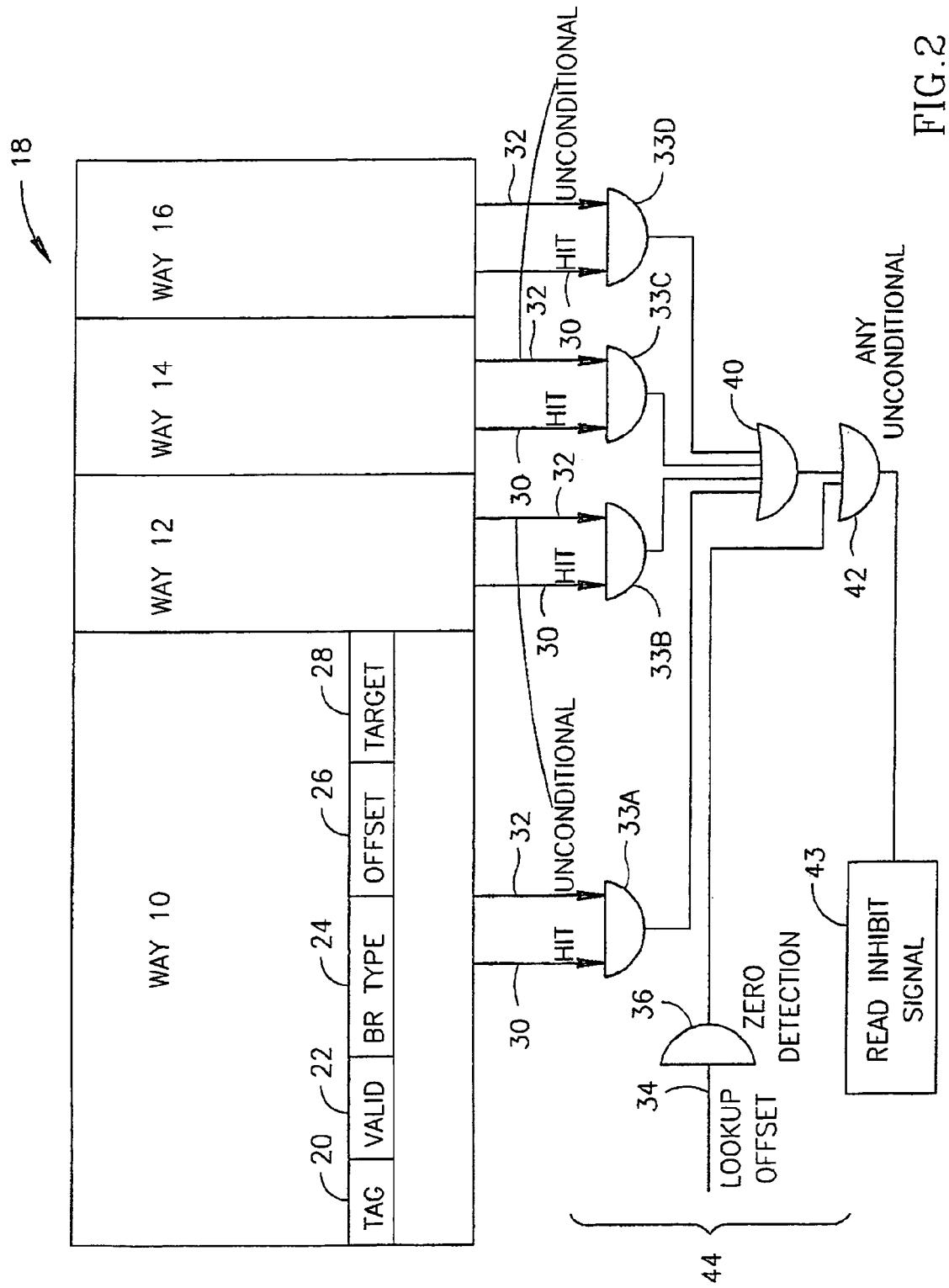
FIG. 2 is a schematic diagram of a branch target buffer with unconditional branch detection logic in accordance with an embodiment of the invention.

Reference is made to FIG. 2, a schematic diagram of a BTB 18 with unconditional branch detection logic in accordance with an embodiment of the invention. For each way 10–16 a Hit/Unconditional 'And Gate' 33A through 33D, respectively, may detect whether any way 10–16 includes a valid unconditional branch. Such detection may be made, for example, by evaluating whether valid field 22 for the way 10 is 1 and possibly, in addition, whether the tag 20 field matches the index. A positive determination on both valid 22 field and tag 20 field, causes a Hit signal 30 to be generated. Further, 'And Gates' 33A–33D detect if a branch type 24 for the instruction that corresponds to ways 10–16, respectively, is unconditional, and if so, indicates this condition by asserting the unconditional signal 32. In the embodiment shown in FIG. 2, if for at least one way, valid 22 field is 1, tag 20 matches the index of the set, and branch type 24 indicates the branch is unconditional, then 'And Gate' 33A yields a 1. In other embodiments, other combinations of signals may be evaluated. The outputs from each of the Hit/Unconditional And Gates 33A through 33D is fed to an 'Or Gate' 40. If any of 'And Gates' 33A through 33D, respectively, yields a 1 then Or Gate 40 yields a 1. This may indicate that one of ways 10–16 in BTB 18 that are being evaluated by the branch prediction unit corresponds to a valid and unconditional branch.

In an embodiment of the invention, a read inhibit signal may be generated to prevent a read of a next sequential chunk, if the offset of the index or current instruction pointer is 0, as is determined by lookup offset signal 34. In such an embodiment, a 0 in the offset of the current instruction pointer indicates that the instruction address that was the entry point onto the line, whose instructions were included in the chunk that was read into BTB 18, is positioned at the beginning of a line, and that all subsequent branch instructions included in the chunk have an offset 26 greater than or equal to 0. A 0 in the offset of the current instruction pointer further indicates that all of such later positioned instructions are still to be processed by the branch prediction unit to derive branch predictions therefrom.

By requiring a 0 in the offset of the current instruction pointer in certain embodiments of the invention, such embodiments may avoid the possibility that a read inhibit signal will be generated in response to an unconditional branch that is detected for a branch instruction whose position on a line is prior to the entry point on such line. In such case, the unconditional branch would not have been processed in the branch prediction unit, and would not have resulted in a branching away from the next sequential-chunk. In an embodiment of the invention, a 0 that is detected by look-up offset signal 34 indicates that unconditional branches predicted in respect of branch instructions corresponding to one of ways 10–16 will result in a branch away from the next sequential chunk. In such embodiment, if look up offset signal 34 does not find a 0 as an offset, no read inhibit signal will be generated. In other embodiments, a 0 in the offset of the index or current instruction pointer may not be required.

Zero detector 36 is typically a 'Static Or' gate such that if lookup offset signal 34 indicates the presence of a 0, zero detection gate 36 yields a 1. If zero detection gate 36 and 'Or gate' 40 are 1, then 'And gate' 42 yields a 1. Of course other components may be used. A 1 generated by And gate 42 may in certain embodiments of the invention prevent a read of a next sequential chunk or generate a signal that prevents a read of a next sequential chunk, generating inhibit signal 43. A signal that prevents a read of a next sequential chunk may be, for example, a signal to throttle the clock of the branch prediction unit or other signals such as a stall signal caused by a missing line in the instruction cache that may cause the fetch unit to wait for the line to be read from memory. In certain embodiments of the invention, gates 33, 36, 40 and 42 may be collectively termed an auxiliary branch prediction circuit 44, and may yield a branch prediction by detecting valid unconditional branches in a subject chunk.

Some or all of such gates including 33, 36, 40 and 42 may be combined or divided into a greater or smaller number of gates, may be deployed in formats other than gates or may have other gates substituted for one or more of such gates. In certain embodiments, ones and zeroes may be inversed or substituted by other relevant symbols, signals or measurements. Other circuits or combinations of components may provide similar functionality, within the scope of the invention.

Figure 3:
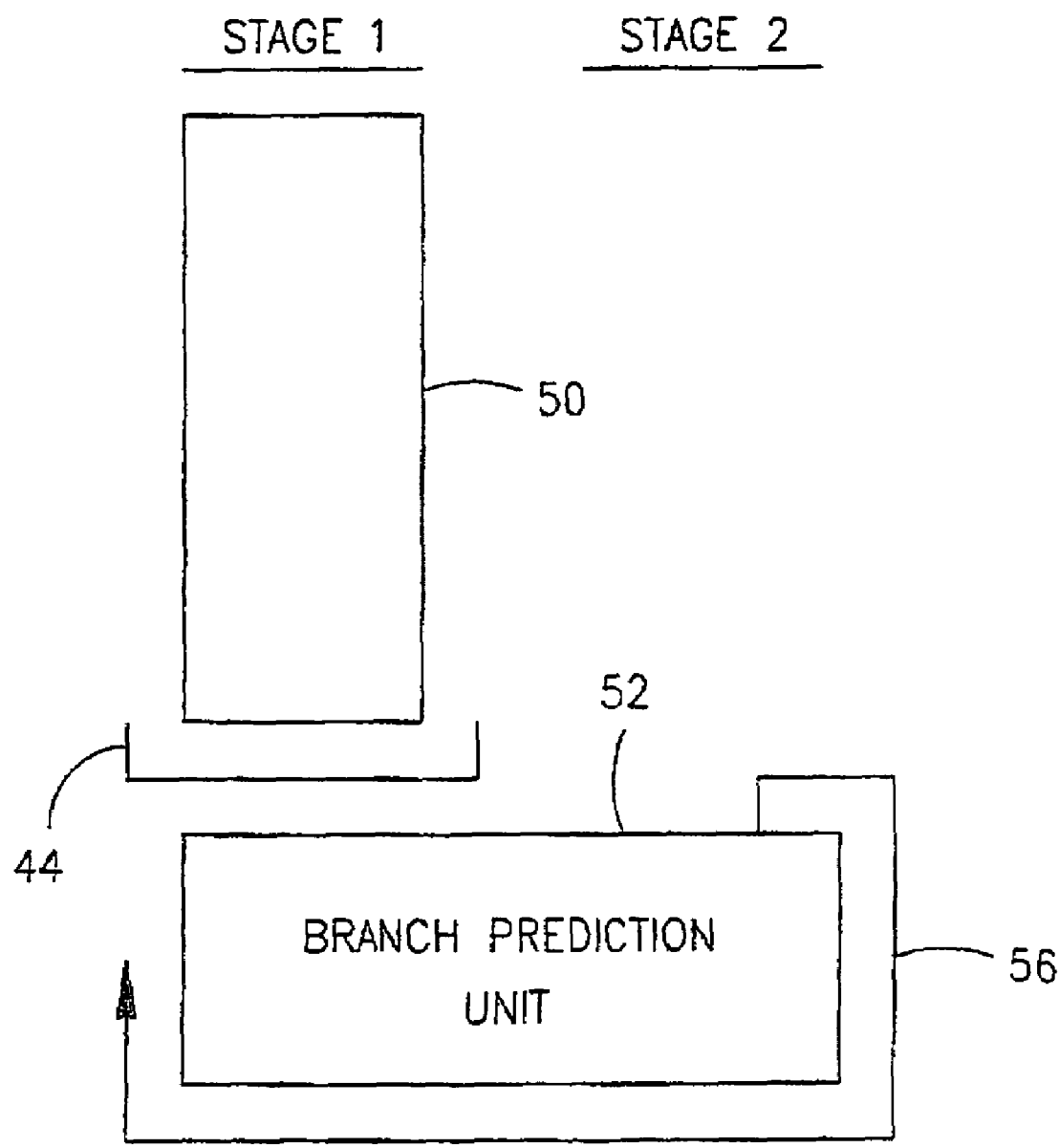
FIG. 3 is a schematic diagram of a front end pipe-line with a multi-cycled branch prediction unit in accordance with an embodiment of the invention.

Reference is made to FIG. 3, a schematic diagram of a front end pipe-line with a multi-cycled branch prediction unit 52 in accordance with an embodiment of the invention. In operation, an instruction from cache 50 enters branch prediction unit 52 in stage 1. Branch prediction unit 52 as in this figure, may take, for example, two clock cycles, labeled as Stage 1 and Stage 2, to generate a prediction about targeted branches of the instructions entered into ways 10–16. In alternate embodiments, other numbers of cycles may be used.

Auxiliary branch prediction circuit 44 may predict that a branch instruction for a way 10–16 will yield a prediction of an unconditional branch, and such prediction may be available prior to the prediction information 56 generated by the branch prediction unit, which may ordinarily not be available until, for example, the second cycle of the branch prediction unit 52. In certain embodiments of the invention, auxiliary branch prediction circuit 44 may prevent a read or provide a read inhibit signal 43 to prevent a read of a next sequential chunk on the basis of the existence of a valid unconditional branch detected by auxiliary branch prediction circuit 44.

Figure 4:
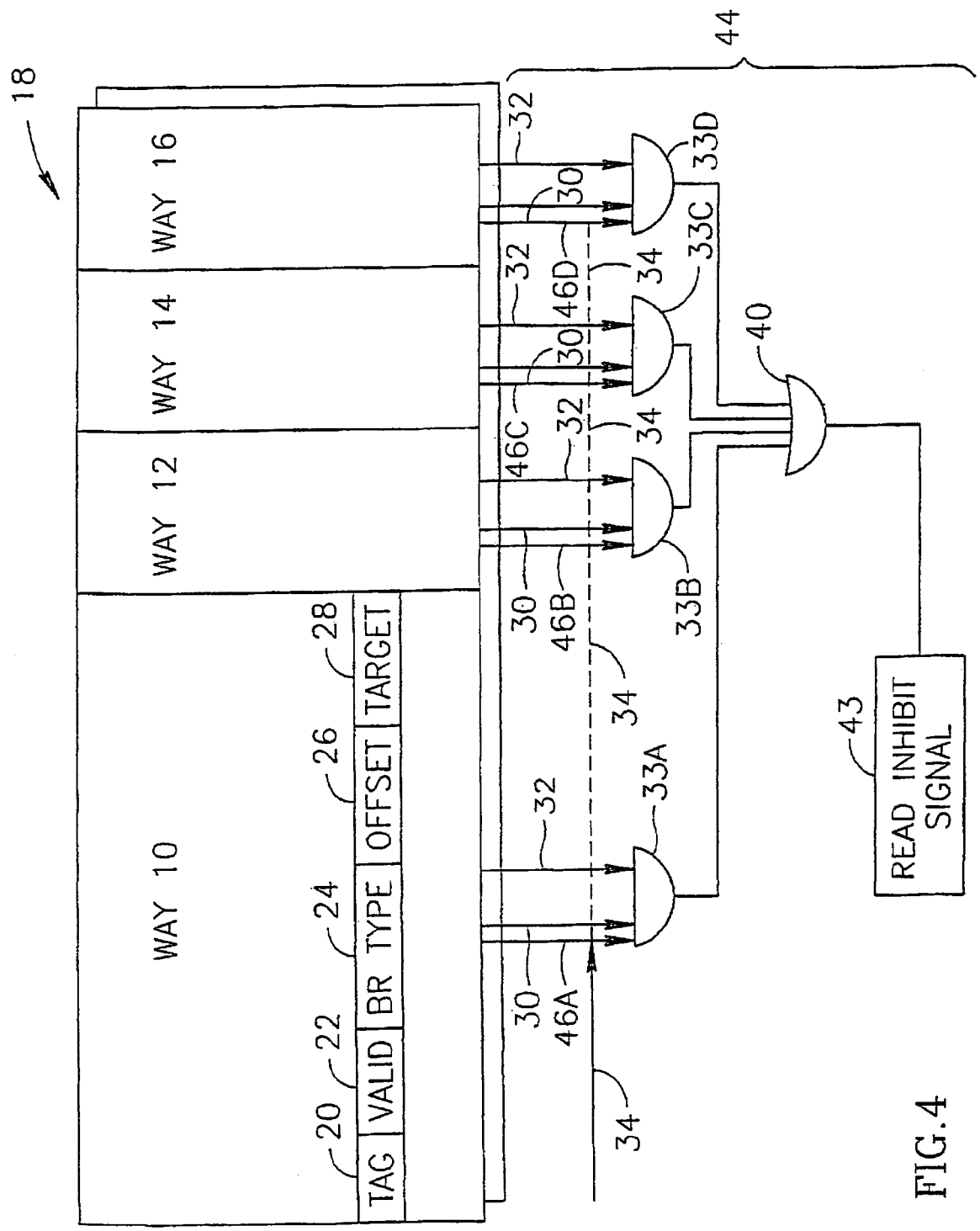
FIG. 4 is a schematic diagram of a branch target buffer with unconditional branch detection logic including a remainder detector in accordance with an embodiment of the invention.

Reference is made to FIG. 4, a schematic diagram of a BTB 18 with unconditional branch detection logic including a remainder detector in accordance with an embodiment of the invention. In certain embodiments of the invention, a circuit may ensure that, for each way 10–16, the offset of the current instruction pointer as the entry point to a line of instruction is less than the offset in a way 10–16. For example, a remainder detector in the form of Comparator gates 46A–46D may be used in place of or in addition to Zero Detector 36. Each of comparator gates 46A–46D may, for example, compare the offset 26 of each way 10–16, in the relevant BTB 18 line to the offset of the current instruction pointer that was the entry point to a line of the instruction, as is indicated by lookup offset signal 34. If the offset 26 in ways 10–16, respectively, is greater than the offset of the current instruction pointer, then Comparator gates 46A–46D, respectively, yield a 1. Each Comparator gate 46A–46D thereby determines if the relative position on a line of a way 10–16 is subsequent to the current instruction pointer that was the entry point onto such line. In such embodiment, And gate 33A will yield a 1 only if tag 20 field and valid 22 field yield a Hit 30 (as described above), branch type 24 field yields an unconditional branch 32, and Comparator gate 46A yields a 1. For example, if the offset of the current instruction pointer is at position 3 on a line, Comparator gates 46A–46D evaluate if the offset position of ways 10–16 are greater than or equal to 3. Other methods of determining and comparing offsets of ways 10–16 to current instruction pointers may be used, and other combinations of signals or information may be evaluated.

Figure 5:
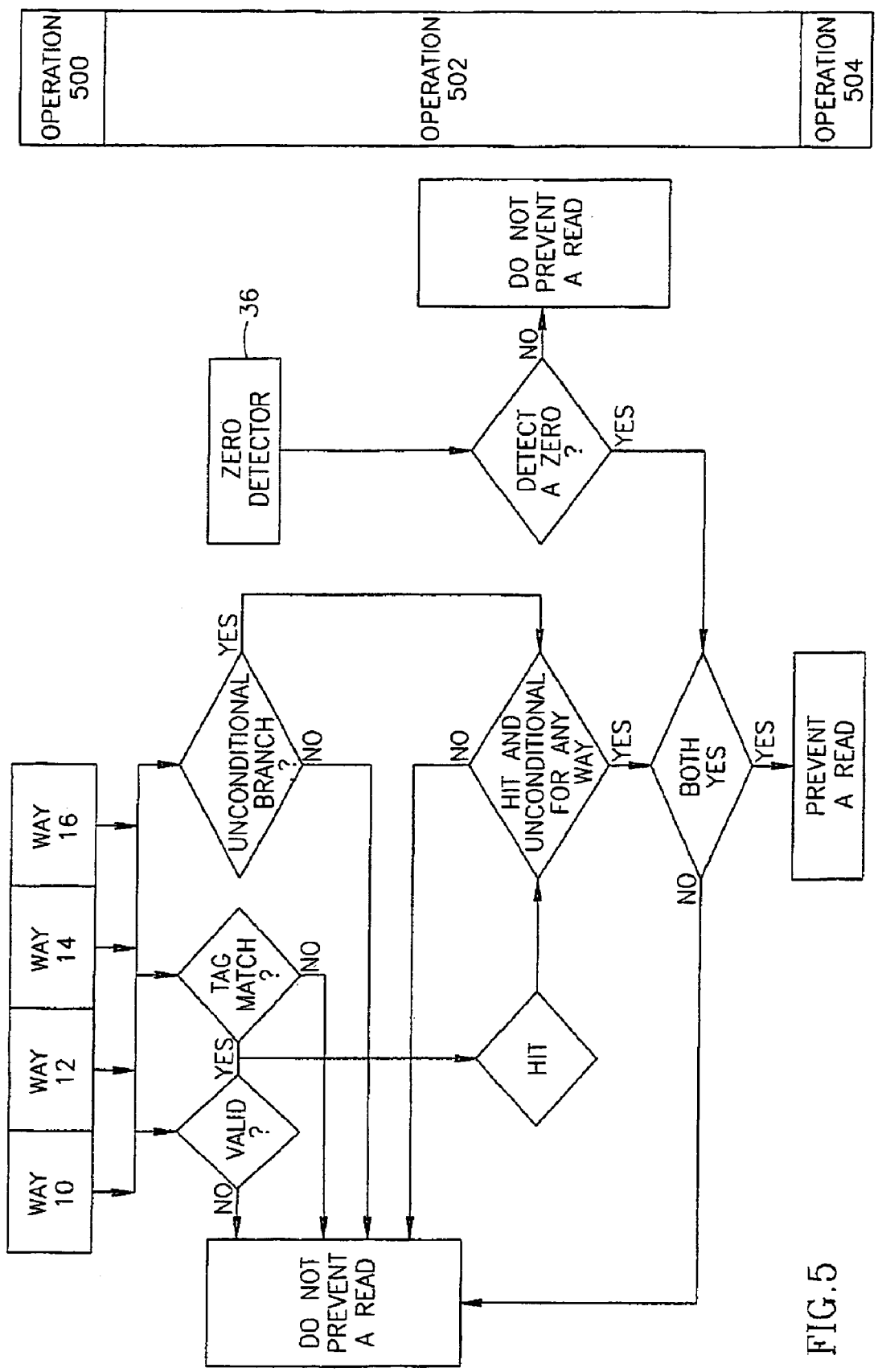
FIG. 5 is a flow diagram depicting several operations in accordance with an embodiment of the invention.

Reference is made to FIG. 5, a flow diagram depicting several operations in accordance with an embodiment of the invention. In operation 500 auxiliary branch prediction circuit 44 determines whether for any of ways 10–16, respectively, tag 20 field and valid 22 field yield a Hit 30, and branch type 24 field corresponds to an unconditional branch 32. In operation 502, zero detector 36 determines whether the lookup offset signal 34 of the current instruction pointer has a value of 0. This may be done simultaneously with operation 500. If for one of ways 10–16, tag 20 field and valid 22 field yield a Hit 30, branch type 24 field corresponds to an unconditional branch 32, and, zero detector 36 finds an offset of 0, then in operation 504 auxiliary branch prediction circuit 44 may generate a signal to prevent or inhibit a read of a next sequential chunk. In certain embodiments, operation 502 may include or be replaced by the operation of determining whether the offset 26 of ways 10–16 is greater than or equal to the position of the entry point onto the subject line.

Figure 6:
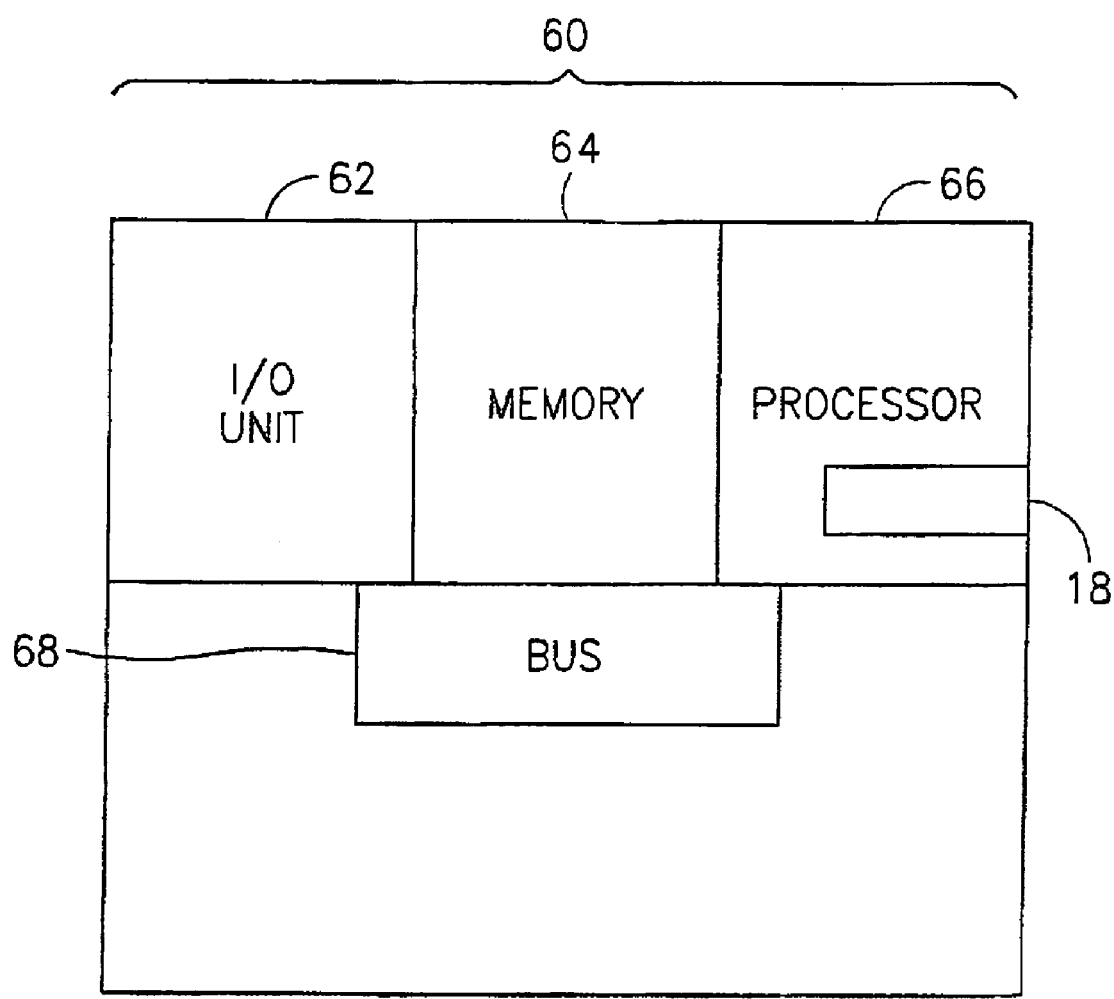
FIG. 6 is a schematic diagram of a computer system including an auxiliary branch circuit predictor, in accordance with an embodiment of the invention.

Reference is made to FIG. 6, a schematic diagram of a computer system 60, including an auxiliary branch circuit predictor 44, in accordance with an embodiment of the invention. Computer system 60 may include an I/O unit 62 such as for example a modem, a network card, a cellular link, a memory device 64, a processor 66 and a bus 68 which may move data and control instructions between components of computer system 60. Processor 66 may include a branch target buffer 18 and a branch prediction unit, which may include an auxiliary branch prediction circuit 44 as is described in respect of FIGS. 2 and 4 above.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
   during branch prediction of a subject chunk, and before a full branch prediction for said subject chunk is formed, preventing a read of a next sequential chunk.

2. A method as in claim 1, wherein said preventing is conditioned on detecting a valid unconditional branch in said subject chunk.

3. A method as in claim 1, wherein said preventing is conditioned on detecting zero as an offset of a current instruction pointer.

4. A method as in claim 1, comprising determining if at least one way in a branch target buffer corresponds to a valid unconditional branch in said subject chunk.

5. A method as in claim 4, comprising detecting if an offset of a way wherein is detected an unconditional branch is greater than an offset of a current instruction pointer.

6. A method as in claim 4, wherein said determining is performed on all ways in said branch target buffer.

7. A method as in claim 6, wherein said determining is performed on ways in said target branch buffer simultaneously.

8. A method as in claim 4, wherein said determining is performed in a single cycle.

9. A method as in claim 4, wherein said determining if at least one way in said branch target buffer corresponds to a valid unconditional branch includes at least detecting if said way indicates validity in a valid field of said way, unconditional in a branch field of said way and a match in a tag field of said way.

10. A method as in claim 1, wherein said preventing is performed while said subject chunk is in a first stage of a branch prediction unit.

11. A method as in claim 1, wherein said preventing is performed before said next sequential chunk is read into a branch prediction unit.

12. A method as in claim 1, wherein said preventing includes at least throttling a clock of a branch prediction unit.

13. A method of branch prediction, the method comprising:
   evaluating a plurality of ways of a subject chunk in a branch target buffer to determine if at least one of said ways corresponds to a valid unconditional branch; and, before a full branch prediction for said subject chunk is formed, preventing a read of a next sequential chunk if a way of said ways corresponds to a valid unconditional branch.

14. A method as in claim 13, wherein said determining includes at least evaluating if one or more of said ways includes at least a valid field indicating validity, a tag field indicating a match and a branch type indicating unconditional.

15. A method as in claim 13, comprising performing said evaluation on each way of said branch target buffer.

16. A method as in claim 13, comprising detecting an offset of zero in a current instruction pointer.

17. A method as in claim 13, wherein said preventing includes at least throttling a clock of a branch prediction unit.

18. A method as in claim 13, wherein said determining includes at least evaluating if an offset of said ways are greater than or equal to an offset of a current instruction pointer.

19. An apparatus comprising: an auxiliary branch prediction circuit to generate, during branch prediction of a subject chunk and before a full branch prediction for said subject chunk is formed, a signal to prevent a read of a next sequential chunk.

20. An apparatus as in claim 19, wherein said auxiliary branch prediction circuit is to determine if at least one way of a plurality of ways in a branch target buffer corresponds to a valid unconditional branch in said subject chunk.

21. An apparatus as in claim 20, wherein said auxiliary branch prediction circuit is to evaluate if one or more of said ways includes at least a valid field indicating validity, a tag field indicating a match and a branch type indicating unconditional.

22. An apparatus as in claim 19, wherein said auxiliary branch prediction circuit is to detect zero as an offset of a current instruction pointer.

23. An apparatus as in claim 20, wherein said auxiliary branch prediction circuit is to determine if an offset of said way is greater than an offset of a current instruction pointer.

24. An apparatus as in claim 19, wherein said auxiliary branch prediction circuit is to determine and generate said signal within a single cycle.

25. A computer system comprising:

an input/output unit; and a processor including a branch prediction unit, said unit including at least a branch prediction circuit to evaluate, in a single cycle, at least one way of a subject chunk in a branch target buffer in order to determine if said way corresponds to a valid unconditional branch, in order to prevent, before a full branch prediction for said subject chunk is formed, a read of a next sequential chunk.

26. A computer system as in claim 25, wherein said branch prediction unit is to detect if an offset of a current instruction pointer is zero.

* * * * *